(12) United States Patent
Kornbrust et al.

(10) Patent No.: US 11,109,608 B2
(45) Date of Patent: Sep. 7, 2021

(54) COMPOSITION FOR COATING FOOD

(71) Applicant: Capol GmbH, Elmshorn (DE)

(72) Inventors: Beate Kornbrust, Hamburg (DE);
Tobias Hufner, Bonn (DE)

(73) Assignee: CAPOL GMBH, Elmshorn (DE)

( * ) Notice: Subject to any disclaimer, the term of this patent is extended or adjusted under 35 U.S.C. 154(b) by 251 days.

(21) Appl. No.: 16/162,434

(22) Filed: Oct. 17, 2018

(65) Prior Publication Data
US 2019/0110495 A1    Apr. 18, 2019

(30) Foreign Application Priority Data
Oct. 18, 2017   (DE) .................. 10 2017 009 678.3

(51) Int. Cl.
*A23G 3/34*    (2006.01)
*A23P 20/10*   (2016.01)

(52) U.S. Cl.
CPC ............ *A23G 3/0063* (2013.01); *A23P 20/11* (2016.08); *A23G 2200/04* (2013.01); *A23G 2200/14* (2013.01); *A23V 2002/00* (2013.01); *A23V 2200/02* (2013.01); *A23V 2200/22* (2013.01); *A23V 2250/032* (2013.01); *A23V 2250/188* (2013.01); *A23V 2250/21* (2013.01); *A23V 2250/712* (2013.01)

(58) Field of Classification Search
CPC .... A23G 3/0063; A23G 2200/04; A23P 20/11
USPC ......................................................... 426/89
See application file for complete search history.

(56) References Cited

U.S. PATENT DOCUMENTS 5,660,865 A * 8/1997 Pedersen ............ A61K 8/375
426/99

FOREIGN PATENT DOCUMENTS

JP           59071387 A  * 10/1998

OTHER PUBLICATIONS

MCT Oil 101_A Review of Medium-Chain Triglycerides (Year: 2020).*

* cited by examiner

*Primary Examiner* — Jyoti Chawla
(74) *Attorney, Agent, or Firm* — Leydig, Voit & Mayer, Ltd.

(57) ABSTRACT

A composition for coating food, in particular confectionery, jellies, and gummies, includes: (A): 60 wt. % to 99.94 wt. %, based on a total amount of the composition, of an oil having a content of monounsaturated fatty acids of more than 70 wt. %, based on a total amount of the oil; and (B): 0.06 wt. % to 0.15 wt. %, based on a total amount of the composition, of ascorbyl palmitate.

20 Claims, 1 Drawing Sheet

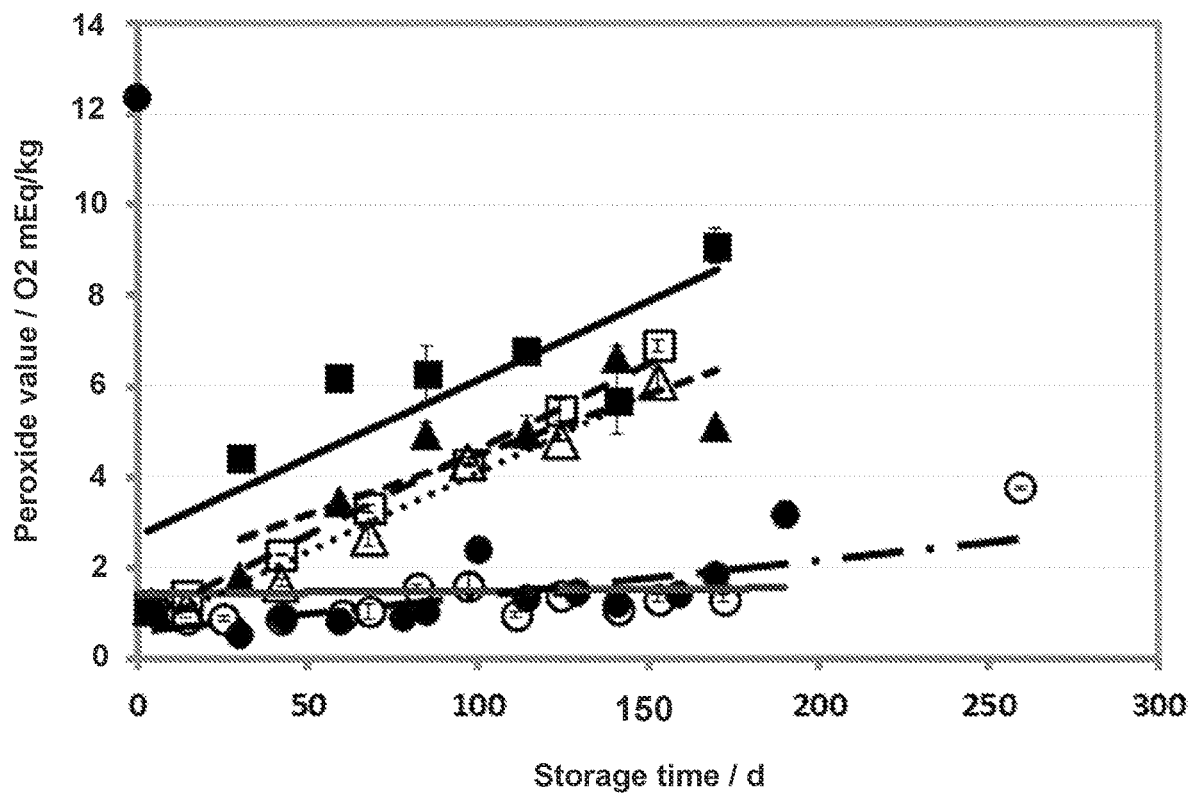

COMPOSITION FOR COATING FOOD

CROSS-REFERENCE TO PRIOR APPLICATION

Priority is claimed to German Patent Application No. DE 10 2017 009 678.3, filed on Oct. 18, 2017, the entire disclosure of which is hereby incorporated by reference herein.

FIELD

The invention relates to a composition for coating food, in particular confectionery, such as jellies and gummies.

BACKGROUND

Food items are often provided with coatings in order to provide protection from external influences, such as variations in temperature, variations in relative humidity or mechanical stresses. Furthermore, coatings can ensure that food items are more packageable and can prevent said items from sticking together. In particular, confectionery, jellies and gummies, such as fruit gummies, gummy candies and licorice, are generally coated with a separating agent immediately after production in order to prevent the goods from sticking together and drying out.

In confectionery, primarily mixtures of waxes (or of waxes and fats) having MCT (medium-chain triglycerides) oil are prepared as separating agents. MCT oil contains saturated fatty acids of length C6-C12. Conventional fatty acids are caproic acid (C6:0), caprylic acid (C8:0), capric acid (C10:0) and lauric acid (C12:0), main components being caprylic acids and capric acids. The origin of the fatty acids is usually palm kernel oil or coconut oil. The fatty acids are generally obtained by hydrolysis of coconut fat and palm kernel oil, fractionation of the medium-chain fatty acids and subsequent esterification with glycerol. The use of saturated fatty acids is advantageous in that said acids are highly resistant to oxidation. This is particularly advantageous when said acids are used as separating agents in food, since the intention here is to prevent a separating agent from having a bad aftertaste as a result of oxidation, or fat ageing and fat deterioration.

MCT oils are, however, disadvantageous in that, as set out above, they do not occur naturally. This means that a growing number of end consumers are skeptical toward this confectionery ingredient that is not perceived as being natural. Furthermore, coconut fat and palm kernel oil are only cultivated in tropical regions, and this also raises questions with regard to their sustainability and other social aspects.

By comparison with MCT oils, native vegetable oils, such as rapeseed and sunflower oils, generally have a high proportion of unsaturated fatty acids. Oxidation processes typically start much faster in this case, and this can in turn lead to a considerably noticeable change in taste (e.g. rancidity) and can result in an unacceptable food item. As a result, said acids can be used only to a limited extent to prepare separating agents in the industrial production of gummy confectionery and dried fruit, for example.

Owing to this high susceptibility of native vegetable oils to deteriorating reactions, MCT oil can only be replaced by native vegetable oils if the best before date (BBD) is adjusted accordingly. However, reducing the best before date is disadvantageous both from a technical point of view and for the consumer.

It is known to make oils less susceptible to oxidation by using antioxidants. When used in food, the antioxidants have to meet a wide range of criteria. For example, they must not be toxic and the taste, smell and color of the food item must not be undesirably affected. Moreover, the antioxidants should be soluble in fat to such a degree that they can be homogeneously distributed in the fatty phase. Finally, they have to be stable during processing operations.

Citric acid, tocopherol, in particular alpha-tocopherol, and ascorbyl palmitate have been found to be antioxidants that are fundamentally suitable for use in fats and oils. In practice, these compounds are generally used in mixtures so as to utilize synergistic effects. In these mixtures, the proportion of ascorbyl palmitate is usually set at a very low amount, e.g. from 0.005 wt. % to 0.05 wt. %, since ascorbyl palmitate can lead to an off-flavor in higher concentrations, and this is undesirable in food.

It has not been possible to date to add suitable additives which make it possible to use oils having a high proportion of unsaturated fatty acids, and yet a satisfactory shelf life. Oils having a high proportion of monounsaturated oils, in particular having a proportion of more than 70 wt. % of monounsaturated oleic acid, such as sunflower oil, are of particular interest for use in the food industry.

SUMMARY

In an embodiment, the present invention provides a composition for coating food, in particular confectionery, jellies, and gummies, comprising: (A): 60 wt. % to 99.94 wt. %, based on a total amount of the composition, of an oil having a content of monounsaturated fatty acids of more than 70 wt. %, based on a total amount of the oil; and (B): 0.06 wt. % to 0.15 wt. %, based on a total amount of the composition, of ascorbyl palmitate.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows:

■ black square: comparative example 1b (no antioxidants, sunflower oil)

□ white square: comparative example 1a (no antioxidants, sunflower oil & MCT oil)

▲ black triangle: example 2a (alpha-tocopherol, citric acid, ascorbyl palmitate, sunflower oil)

△ white triangle: example 2b (alpha-tocopherol, citric acid, ascorbyl palmitate, sunflower oil, sunflower oil & MCT oil)

● black circle: example 3b (ascorbyl palmitate, sunflower oil)

○ white circle: example 3a (ascorbyl palmitate, sunflower oil & MCT oil)

DETAILED DESCRIPTION

The problem addressed by the invention is therefore that of providing a composition for coating food, in particular confectionery, jellies and gummies, which has as high a proportion as possible of oils having a high proportion of unsaturated fatty acids, in particular monounsaturated fatty acids, and yet a long shelf life.

This problem is solved by a composition for coating food, in particular confectionery, jellies and gummies, comprising the following components (A) and (B):
- (A): 60 wt. % to 99.94 wt. %, based on the total amount of the composition, of an oil having a content of monounsaturated fatty acids, in particular monounsaturated oleic acid, of more than 70 wt. %, for example from 75 wt. % to 97 wt. %, based on the total amount of the oil,
- (B): 0.06 wt. % to 0.15 wt. %, based on the total amount of the composition, of ascorbyl palmitate.

According to the invention, it has been found that ascorbyl palmitate is extremely suitable as a base antioxidant in compositions intended for coating food and having a high content of unsaturated fatty acids. This was surprising to a person skilled in the art because, as set out above, ascorbyl palmitate has an off-flavor in higher amounts, and also only has a very low solubility in oil of approximately 0.03 wt. %. Therefore, a person skilled in the art had to conclude that, when adding higher amounts of ascorbyl palmitate (corresponding to the high proportion of unsaturated fatty acids), only a low amount is available for the antioxidant effect, whereas the undissolved residue remains unused and merely strengthens the off-flavor. Therefore, a person skilled in the art had to assume that ascorbyl palmitate is not suitable as a base antioxidant for adding additives to oils having a high content of unsaturated fatty acids.

It was however surprisingly found that ascorbyl palmitate in the composition according to the invention in proportions of from 0.06 wt. % to 0.15 wt. % does not strengthen the off-flavor of said composition and has an excellent antioxidative effect despite having low solubility in oil. This makes it possible to provide the composition according to the invention with a high proportion of unsaturated fatty acids, and yet obtain a composition having a satisfactory BBD of preferably more than 18 months, for example from 18 to 24 months. As a result, it is possible to keep the proportion of MCT oils low or to dispense with said oils completely.

According to the invention, the BBD is determined by measuring the peroxide values (POV) over time. POV is a measure for the content of peroxidically bonded oxygen in fats. Hydrogen peroxides, in addition to low amounts of other peroxides, in particular are produced as primary oxidation products as a result of oxidation processes (autoxidation). Determining this is a suitable means for establishing the extent of the oxidative change. Therefore, POV gives an indication of the oxidation degree of the sample and makes it possible to assess the extent to which the present fat has deteriorated. In this connection, it should be noted that, as the degree of oxidation increases, the decay of the peroxides increases, and therefore the POV also decreases. However, POV correlates with any off-tastes that may occur. The peroxide values are measured according to the methods described in the European Pharmacopoeia, 8th edition; volume 1, main edition 2014, chapter 2.5.5.

The method can be used for all animal and vegetable fats and oils, fatty acids and mixtures. This method can be used provided that the sample has a peroxide content of from 0 to 30 milliequivalents active oxygen per kilogram.

When measuring the BBD according to the invention on the basis of the peroxide values, the sample is subjected to accelerated storage at 40° C. Owing to the increased storage temperature, the actual amount of days in storage is calculated by multiplication by a factor of 4. According to the invention, a POV of greater than 10 is assumed to indicate rancidity.

According to the invention, the composition comprises from 60 to 99.94 wt. %, more preferably from 70 wt. % to 99 wt. %, even more preferably from 85 wt. % to 95 wt. %, based on the total amount of the composition, of an oil having a content of monounsaturated fatty acids, in particular monounsaturated oleic acid, of more than 70 wt. %, for example from 75 wt. % to 97 wt. %, and/or from 75 wt. % to 95 wt. %, more preferably from 80 wt. % to 97 wt. %, even more preferably from 80 wt. % to 95 wt. %, based on the total amount of the oil.

In a preferred embodiment of the invention, the proportion of ascorbyl palmitate in the composition according to the invention is from 0.06 to 0.14 wt. %, more preferably from 0.08 wt. % to 0.13 wt. %, and in particular from 0.1 wt. % to 0.12 wt. %, in each case based on the total amount of the composition.

Another surprising effect was observed in practical tests. For instance, ascorbyl palmitate surprisingly has a higher antioxidative effect in the composition according to the invention if it is used in isolation, i.e. not in combination with citric acid and tocopherols, in particular alpha-tocopherol, as is currently conventional.

Therefore, according to the invention, although conceivable, it is not preferable to use further antioxidants, in particular citric acid and tocopherols, in particular alpha-tocopherol, in combination with ascorbyl palmitate. Within the meaning of the invention, antioxidants are understood to mean substances which can be used to give fats a longer shelf life by protecting them from changes in taste. Said substances slow down or prevent other substances from oxidizing. In an embodiment that is particularly preferred according to the invention, the composition therefore has a proportion of further antioxidants, in particular tocopherol, more particularly alpha-tocopherol, and/or citric acid, of less than 0.08 wt. %, and in particular less than 0.06 wt. %, in each case based on the total amount of the composition.

Particularly preferred components A are native oils, in particular "high-oleic sunflower oils". High-oleic sunflower oils are distinguished by a particularly high proportion of monounsaturated oleic acid. Other preferred oils of component A) are corn oil, almond oil, olive oil, rapeseed oil, sunflower oil, wheat germ oil and/or mixtures thereof.

In another preferred embodiment of the invention, the composition comprises polyunsaturated fatty acids in an amount of less than 15 wt. %, more preferably less than 13 wt. %, in particular less than 10 wt. %, in each case based on the total weight of the composition.

Overall, the composition according to the invention is therefore preferably distinguished by a high proportion of monounsaturated fatty acids, in particular oleic acid. Accordingly, the proportion of saturated fatty acids in the composition is preferably low, in particular is less than 25 wt. %, for example from 0 to 25 wt. %, and/or from 5 wt. % to 25 wt. %, and/or less than 20 wt. %, for example from 5 wt. % to 20 wt. %, in each case based on the total amount of the composition.

In another preferred embodiment of the invention, the composition comprises from 4 wt. % to 15 wt. %, more preferably from 6 wt. % to 12 wt. %, and in particular from 8 wt. % to 11 wt. %, of wax (component (C)).

Within the meaning of the invention, a wax is understood to mean an organic compound which has at least one, preferably both, of the following properties:

1. The compound is kneadable at 20° C., is brittle to firm, has a coarse to fine crystalline structure, and is transparent (to color) to opaque.
2. The compound melts above 40° C. without decomposing, is slightly fluid (has low viscosity) a little above the melting point, has a strongly temperature-dependent consistency and solubility, and can be polished under slight pressure.

The wax is preferably almost insoluble in water, but soluble in organic, non-polar media. Waxes that are particularly preferred according to the invention are palm wax, carnauba wax, beeswax, paraffin waxes, microcrystalline waxes and/or mixtures thereof.

In another preferred embodiment of the invention, the composition according to the invention comprises vegetable fat (component (D)). Component (D) is present, if at all, preferably in a proportion of from 10 to 45 wt. %, more preferably from 10 to 35 wt. %, in particular from 20 to 35 wt. %. Within the meaning of the invention, the term "fat" is understood to mean esters of the alcohol glycerol having three, usually different, fatty acids which are solid at room temperature (20° C.). The fat is preferably distinguished in that it contains from 50 to 95 wt. % of saturated fatty acids. Coconut fat, cocoa butter, rapeseed fat and palm fat are particularly preferred.

The present invention also relates to the use of a composition according to the invention in accordance with one or more of the aforementioned embodiments for coating food, in particular confectionery, jellies and gummies, such as fruit gummies, gummy candies, licorice and dried fruit, and to the food coated in this manner.

The invention is explained in greater detail below with reference to several examples:

Comparative Example 1a: Preparation of a Composition for Coating Food (not Part of the Invention)

A composition for coating food is prepared by mechanically mixing 5-15 wt. % of vegetable and animal waxes (in particular carnauba wax and beeswax) and 85-95 wt. % of native oils (in particular MCT oil and sunflower oil).

Comparative Example 1b: Preparation of a Composition for Coating Food (not Part of the Invention)

A composition for coating food is prepared by mechanically mixing 5-15 wt. % of vegetable and animal waxes (in particular carnauba wax and beeswax) and 85-95 wt. % of native oils (in particular sunflower oil).

Example 2a: Preparation of a Composition According to the Invention for Coating Food A composition for coating food is prepared by mechanically mixing 5-15 wt. % of vegetable and animal waxes (in particular carnauba wax and beeswax) and 85-95 wt. % of native oils (in particular HOSO sunflower oil) and a combination of citric acid, ascorbyl palmitate and alpha-tocopherol as antioxidants in a total amount of 0.105 wt. %. The proportion of ascorbyl palmitate in the composition is 0.05 wt. %.

Example 2b: Preparation of a Composition According to the Invention for Coating Food A composition for coating food is prepared by mechanically mixing 5-15 wt. % of vegetable and animal waxes (in particular carnauba wax and beeswax) and 85-95 wt. % of native oils (in particular MCT oil and sunflower oil) and a combination of citric acid, ascorbyl palmitate and tocopherol as antioxidants in a total amount of 0.105 wt. %. The proportion of ascorbyl palmitate in the composition is 0.05 wt. %.

Example 3a: Preparation of a Composition According to the Invention for Coating Food A composition for coating food is prepared by mechanically mixing 5-15 wt. % of vegetable and animal waxes (in particular carnauba wax and beeswax) and 85-95 wt. % of vegetable oils (in particular MCT oil and sunflower oil) and 0.09-0.15 wt. % of ascorbyl palmitate as an antioxidant.

Example 3b: Preparation of a Composition According to the Invention for Coating Food A composition for coating food is prepared by mechanically mixing 5-15 wt. % of vegetable and animal waxes (in particular carnauba wax and beeswax) and 85-95 wt. % of a vegetable oil (in particular HOSO sunflower oil) and 0.09-0.15 wt. % of ascorbyl palmitate as an antioxidant.

All of compositions 1 to 3 have a neutral taste.

Example 4: Analyzing the Oxidative Breakdown of the Compositions from Examples 1-3

The oxidative breakdown of the compositions from examples 1 to 3 is analyzed by determining the peroxide value as an indicator of fat deterioration over time during storage at 40° C. The storage duration can be correlated with a factor of 4 owing to the higher storage temperature, and therefore e.g. 100 days corresponds to a storage duration of 400 days.

It is apparent that, as expected, replacing just 50 wt. % of MCT oil (comparative example 1a) with HOSO leads to improved shelf life and slower deterioration than completely replacing MCT oil with HOSO (comparative example 1b).

Ascorbyl palmitate is also shown to be highly effective, and leads to a significantly longer shelf life and slower deterioration in combination with citric acid and tocopherol in examples 2(a/b) and 3(a/b) according to the invention by comparison with the examples that are not part of the invention, i.e. examples 1a and 1b.

Surprisingly, it is also demonstrated that ascorbyl palmitate is more effective when used in isolation, i.e. not in a mixture with citric acid and alpha-tocopherol. For instance, example 3b, in which MCT oil was completely replaced by HOSO, has in fact a lower degree of oxidative breakdown than example 2a, in which just 50 wt. % of the MCT oil was replaced by HOSO.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A composition for coating food, in particular confectionery, jellies, and gummies, comprising:
   (A): 60 wt. % to 99.94 wt. %, based on a total amount of the composition, of an oil having a content of monounsaturated fatty acids of more than 70 wt. %, based on a total amount of the oil; and
   (B): 0.06 wt. % to 0.15 wt. %, based on a total amount of the composition, of ascorbyl palmitate.

2. The composition according to claim 1, wherein the composition has a best before date of more than 18 months.

3. The composition according to claim 1, wherein the proportion of ascorbyl palmitate is from 0.06 to 0.14 wt. %, based on the total amount of the composition.

4. The composition according to claim 1, wherein a proportion of further antioxidants and/or citric acid is in each case less than 0.08 wt. %, based on the total amount of the composition.

5. The composition according to claim 1, wherein the proportion of component (A) is from 85 wt. % to 95 wt. %, based on the total amount of the composition.

6. The composition according to claim 1, wherein the oil has a content of monounsaturated fatty acids of from 75 wt. % to 97 wt. %, based on the total amount of the oil.

7. The composition according to claim 1, wherein the oil comprises a native oil selected from a group consisting of high-oleic sunflower oil, corn oil, almond oil, olive oil, rapeseed oil, sunflower oil, wheat germ oil, and/or mixtures thereof.

8. The composition according to claim 1, the composition having a proportion of polyunsaturated fatty acids in an amount of less than 15 wt. %, based on the total weight of the composition.

9. The composition according to claim 1, the composition having a proportion of saturated fatty acids of less than 25 wt. %, and/or less than 20 wt. %, based on the total amount of the composition.

10. The composition according to claim 1, further comprising from 4 wt. % to 15 wt. % of wax (component (C)), based on the total amount of the composition.

11. The composition according to claim 1, wherein the wax is selected from a group consisting of palm wax, carnauba wax, beeswax, paraffin wax, and microcrystalline wax, and/or mixtures thereof.

12. The composition according to claim 1, further comprising vegetable fat (component (D)) in a proportion of from 10 wt. % to 45 wt. %, based on the total amount of the composition.

13. A method of using the composition according to claim 1, the method comprising:
   coating food with the composition.

14. A food, coated with the composition according to claim 1.

15. The composition according to claim 1, wherein the monounsaturated fatty acids comprise monounsaturated oleic acid.

16. The composition according to claim 3, wherein the proportion of ascorbyl palmitate is from 0.08 wt. % to 0.13 wt. %, based on the total amount of the composition.

17. The composition according to claim 16, wherein the proportion of ascorbyl palmitate is from 0.1 wt. % to 0.12 wt. %, based on the total amount of the composition.

18. The composition according to claim 4, wherein the further antioxidants comprise tocopherol.

19. The composition according to claim 18, wherein the tocopherol comprises alpha-tocopherol.

20. The composition according to claim 4, wherein the proportion of further antioxidants and/or citric acid is in each case less than 0.06 wt. %, based on the total amount of the composition.

* * * * *